(12) United States Patent
Nakamura

(10) Patent No.: US 7,768,585 B2
(45) Date of Patent: Aug. 3, 2010

(54) DISPLAY DEVICE WITH STATIC ELECTRICITY PROTECTING CIRCUIT

(75) Inventor: Yayoi Nakamura, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 413 days.

(21) Appl. No.: 11/804,971

(22) Filed: May 21, 2007

(65) Prior Publication Data
US 2007/0273802 A1 Nov. 29, 2007

(30) Foreign Application Priority Data
May 23, 2006 (JP) ............................ 2006-142342
May 23, 2006 (JP) ............................ 2006-142343

(51) Int. Cl.
*G02F 1/1333* (2006.01)
(52) U.S. Cl. ...................................... 349/40
(58) Field of Classification Search ................. None
See application file for complete search history.

(56) References Cited

U.S. PATENT DOCUMENTS

| | | | |
|---|---|---|---|
| 6,043,971 A * | 3/2000 | Song et al. .................. 361/111 |
| 6,411,348 B2 | 6/2002 | Kawai et al. |
| 6,724,456 B2 | 4/2004 | Kamiya |
| 7,342,617 B2 | 3/2008 | Tanaka et al. |
| 2001/0045996 A1 | 11/2001 | Kawai et al. |
| 2001/0050835 A1* | 12/2001 | Uchida ........................ 361/111 |
| 2002/0154263 A1 | 10/2002 | Kamiya |
| 2003/0020845 A1* | 1/2003 | Lee et al. ........................ 349/40 |
| 2004/0027502 A1* | 2/2004 | Tanaka et al. .................. 349/40 |
| 2007/0007523 A1* | 1/2007 | Lai ................................ 257/59 |
| 2008/0278648 A1* | 11/2008 | Chang .......................... 349/40 |

FOREIGN PATENT DOCUMENTS

| | | |
|---|---|---|
| CN | 1766722 A | 5/2006 |
| JP | 08-179351 A | 7/1996 |

(Continued)

OTHER PUBLICATIONS

Chinese Office Action dated Aug. 29, 2008 (5 pages), and English translation thereof (4 pages) issued in counterpart Chinese Application No. 200710104197.3.

(Continued)

*Primary Examiner*—Michelle R Connelly Cushwa
(74) *Attorney, Agent, or Firm*—Frishauf, Holtz, Goodman & Chick, P.C.

(57) ABSTRACT

A display device includes a substrate having a display area and a non-display area. A plurality of pixel electrodes are arrayed in a matrix within the display area on the substrate. A plurality of display elements are arranged corresponding in position to the pixel electrodes. A plurality of switching thin-film transistors are connected respectively to the pixel electrodes. A plurality of scanning lines are provided to supply a scanning signal to the switching thin-film transistors. A plurality of data lines are provided to supply a data signal to the switching thin-film transistors. The non-display area of the substrate includes a driver forming area in which a driver for driving at least one of the scanning line and the data line is to be mounted, and a static-electricity protecting circuit is provided in the driver forming area.

8 Claims, 10 Drawing Sheets

FOREIGN PATENT DOCUMENTS

| | | |
|---|---|---|
| JP | 08-179359 A | 7/1996 |
| JP | 09-329796 A | 12/1997 |
| JP | 10-020336 A | 1/1998 |
| JP | 2001-142096 A | 5/2001 |
| JP | 2002-287703 A | 10/2002 |
| JP | 2002-350892 A | 12/2002 |
| JP | 2003-207756 A | 7/2003 |
| JP | 2005-93459 A | 4/2005 |
| JP | 2005-093459 A | 4/2005 |
| JP | 2006-047643 A | 2/2006 |
| KR | 2006-0000939 A | 1/2006 |
| WO | WO 98/48321 A1 | 10/1998 |

OTHER PUBLICATIONS

Korean Office Action (and English translation thereof) dated Jan. 30, 2008, issued in a counterpart Korean Application.

Japanese Office Action (and English translation thereof) dated Jul. 1, 2008, issued in a counterpart Japanese Application.

Japanese Office Action (and English translation thereof) dated Aug. 5, 2008, issued in a counterpart Japanese Application.

Japanese Office Action (and English translation thereof) dated Sep. 30, 2008, issued in counterpart Japanese Application No. 2006-142342.

Japanese Office Action (and English translation thereof) dated Sep. 30, 2008, issued in counterpart Japanese Application No. 2006-142343.

* cited by examiner

DISPLAY DEVICE WITH STATIC ELECTRICITY PROTECTING CIRCUIT

CROSS-REFERENCE TO RELATED APPLICATIONS

This application is based upon and claims the benefit of priority from prior Japanese Patent Applications No. 2006-142342, filed May 23, 2006; and No. 2006-142343, filed May 23, 2006, the entire contents of both of which are incorporated herein by reference.

BACKGROUND OF THE INVENTION

1. Field of the Invention

The present invention relates to a display device with a static electricity protecting circuit.

2. Description of the Related Art

There is known an active matrix liquid crystal display (LCD) device having the following configuration to prevent the characteristic shift of a switching thin-film transistor caused by static electricity and the insulation breakdown etc. In the LCD device, a scanning-line static-electricity protecting line and scanning-line static-electricity protecting thin film transistors each connected between each scanning line and the scanning-line static-electricity protecting line are arranged outside a display area. The display area contains pixel electrodes and switching thin-film transistors connected to the pixel electrodes, which are located at and near crosspoints of a plurality of scanning lines and a plurality of data lines arranged in a matrix (see for example, Jpn. Pat. Appln. KOKAI Publication No. 2005-93459).

As described above, in the conventional LCD device, the scanning-line static-electricity protecting line, scanning-line static-electricity protecting thin film transistor, data-line static-electricity protecting line, and data-line static-electricity protecting thin film transistor are arranged in a frame area outside the display area. With such a configuration, the frame area becomes large to secure the area in which those lines and transistors are arranged.

BRIEF SUMMARY OF THE INVENTION

Accordingly, an object of the present invention is to provide a display device capable of reducing the frame area.

To achieve the above object, a display device according to one aspect of the present invention comprises:

a substrate having a display area and a non-display area;

a plurality of pixel electrodes arrayed in a matrix within the display area on the substrate;

a plurality of display elements arranged corresponding in position to the pixel electrodes;

a plurality of switching thin-film transistors connected respectively to the pixel electrodes;

a plurality of scanning lines to supply a scanning signal to the switching thin-film transistors; and a plurality of data lines to supply a data signal to the switching thin-film transistors, wherein the non-display area of the substrate includes a driver forming area in which a driver for driving at least one of the scanning line and the data line is to be mounted, and a static-electricity protecting circuit is provided in the driver forming area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
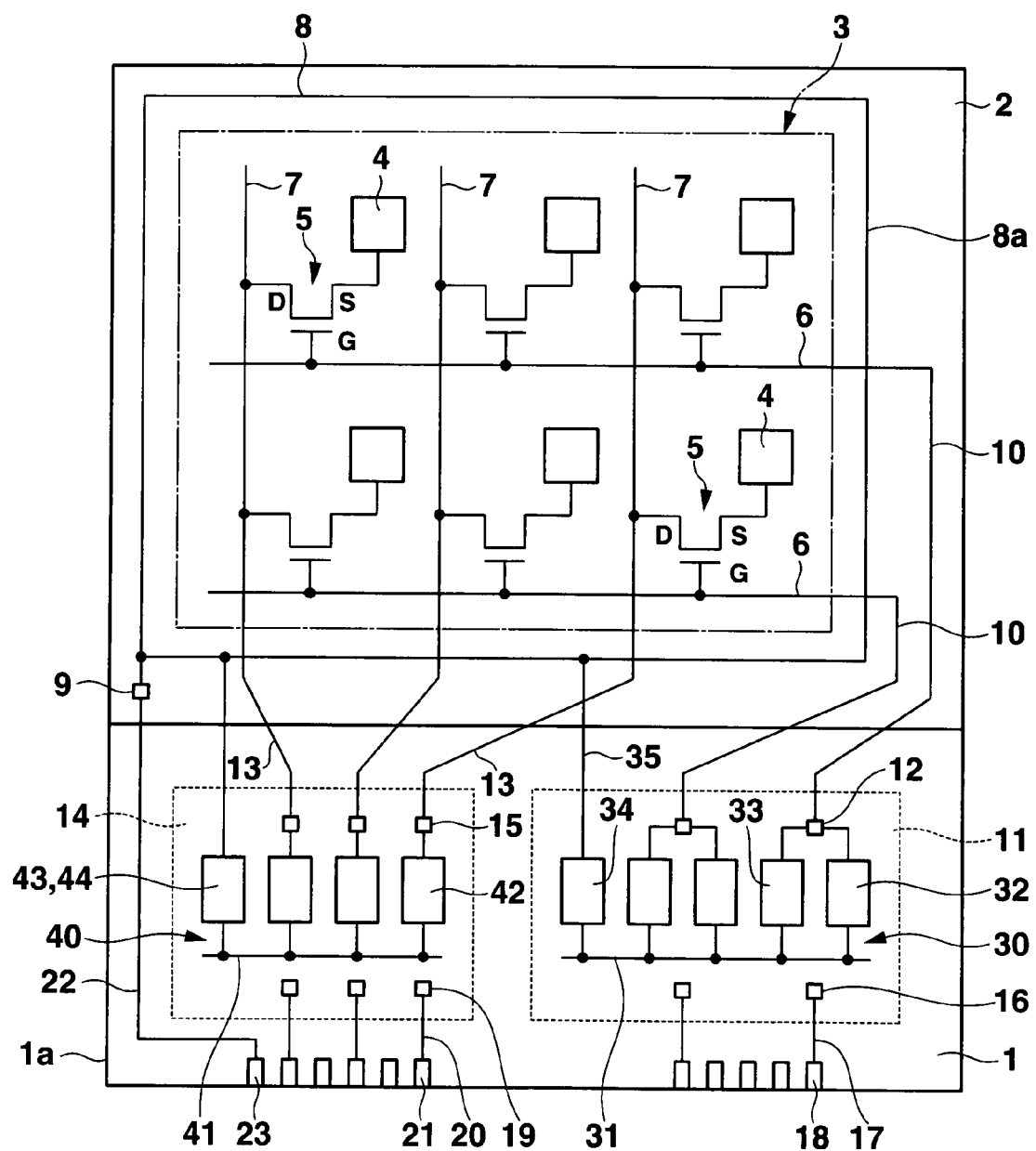
FIG. 1 is a plan view showing an equivalent circuit of a main portion of an LCD device according to a first embodiment of the present invention.

FIG. 1 is a plan view showing an equivalent circuit of a main portion of an LCD device according to a first embodiment of the present invention. The LCD device includes an active substrate 1 and a counter substrate 2 located above the active substrate 1. The active substrate 1 and the counter substrate 2 are bonded together in a state that a rectangular sealing frame or material (not shown) is inserted therebetween. A space on the inner side of the sealing frame between the substrates 1 and 2 is filled with a liquid crystal (not shown). A lower part (lower side in FIG. 1) of the active substrate 1 is extended out of the counter substrate 2. The extended part is referred to as an extended part 1a. In FIG. 1, a rectangular area enclosed by a one-dot chain line is a display area 3. An upper area of the extended part 1a is a non-display area.

A plurality of pixel electrodes 4 arrayed in a matrix, switching thin-film transistors 5 of an n-MOS type which have source electrodes S respectively connected to the pixel electrodes 4, scanning lines 6 which extend in a row direction (horizontal direction in FIG. 1) and supply scanning signals to gate electrodes G of the switching thin-film transistors 5, and data lines 7 which extend in a column direction (vertical direction in FIG. 1) and supply data signals to drain electrodes D of the switching thin-film transistors 5 are arranged within the display area 3 on the active substrate 1.

In FIG. 1, the pixel electrodes 4 of only 2×3 are shown for clarity of illustration. Actually, the pixel electrodes of several hundreds×several hundreds or more number of pixel electrodes are arrayed. A rectangular frame-like common line 8 and a common connection pad 9 electrically connected to the common line are located around the display area 3 on the active substrate 1. The common connection pad 9 is electrically connected to a common electrode (not shown) provided on the lower surface of the counter substrate 2 through an inter-substrate conductive member (not shown).

The right end of each of the scanning lines 6 is electrically connected to a scanning output terminal (connection terminal) 12 through a scanning-line distribution wire 10 routed from the right side of the display area 3 to the lower side thereof. The scanning output terminals 12 are provided in an upper region of the scanning line driver forming area 11 indicated by a dotted line and located on the right side on the extended part 1a of the active substrate 1. The lower end of each of the data lines 7 is electrically connected to a data output terminal (connection terminal) 15 through a data-line distribution wire 13 routed to the lower side of the display area 3. The data output terminals 15 are provided in an upper region of the data line driver forming area 14 indicated by a dotted line and located on the left side on the extended part 1a of the active substrate 1.

Scanning input terminals 16 are provided in a lower region of the scanning line driver forming area 11. The scanning input terminals 16 are respectively connected through scanning distribution wires 17, which are located under the scanning input terminals, to external scanning connection terminals 18, which are located under the scanning distribution wires. Data input terminals 19 are provided in a lower region of the data line driver forming area 14. The data input terminals 19 are respectively connected through data distribution wires 20, which are located under the data input terminals, to external data connection terminals 21, which are located under the data distribution wires.

The common connection pad 9 is connected through a common distribution wire 22, which is located under the common connection pad 9, to an external common connection terminal 23, which is located under the common distribution wire 22.

Although not illustrated for clarity of illustration, a scanning line driving chip is mounted on the scanning line driver forming area 11 of the active substrate 1. The scanning line driving chip contains a scanning line driving circuit having external electrodes, which correspond to the scanning input terminals 16 and the scanning output terminals 12. A chip-on-glass (COG) method is used for bonding the external electrodes of the scanning line driving chip and the scanning input terminals 16, and for bonding the external electrodes of the scanning line driving chip and the scanning output terminals 12. A soldering method or an anisotropy electric conductive binder method may be used for the bonding.

A data line driving chip containing a data line driving circuit is mounted on the data line driver forming area 14 of the active substrate 1. The COG method is used for bonding the external electrodes of the data line driving chip to the data input terminals 19 and for bonding the external electrodes of the data line driving chip to the data output terminals 15. Also in this case, the soldering method or the anisotropy electric conductive binder method may be used for the bonding.

Figure 2:
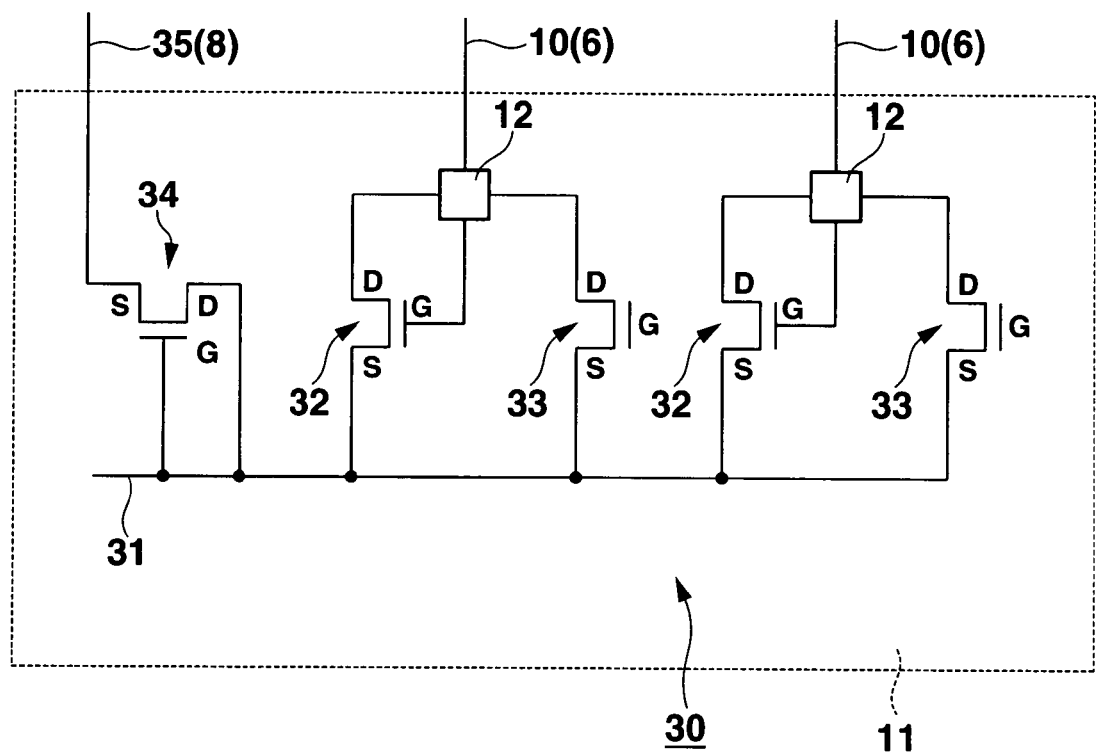
FIG. 2 is a plan view showing an equivalent circuit of a portion of a scanning-line static-electricity protecting circuit, which is formed in a scanning line driver forming area shown in FIG. 1.

FIG. 2 is a plan view showing an equivalent circuit of a portion of a scanning-line static-electricity protecting circuit 30 which is formed in a scanning line driver forming area 11 in FIG. 1. A scanning-line static-electricity protecting line 31 is provided within the scanning line driver forming area 11. First and second scanning-line static-electricity protecting thin film transistors (scanning-line static-electricity protecting elements) 32 and 33 are provided in a parallel connection between a scanning-line static-electricity protecting line 31 and each of the scanning output terminals 12 (i.e., the scanning-line distribution wires 10 connected to the scanning lines 6 shown in FIG. 1), as shown.

The first scanning-line static-electricity protecting thin film transistor 32 is of a diode-connected n-MOS type. A gate electrode G and a drain electrode D of the transistor 32 are electrically connected to the scanning output terminal 12, and a source electrode S thereof is electrically connected to the scanning-line static-electricity protecting line 31. The second scanning-line static-electricity protecting thin film transistor 33 is of a floating gate type. A gate electrode G of the transistor 33 is electrically connected to nothing, i.e., in a floating state. A drain electrode D of the transistor 33 is electrically connected to the scanning output terminal 12, and a source electrode S thereof is electrically connected to the scanning-line static-electricity protecting line 31.

One end of the scanning-line static-electricity protecting line 31 is electrically connected to the common line 8 shown in FIG. 1 via a connection thin film transistor 34 and a connection distribution wire 35. A gate electrode G and a drain electrode D of the transistor 34 are electrically connected to the scanning-line static-electricity protecting line 31, and a source electrode S thereof is electrically connected to the common line 8 via the connection distribution wire 35.

Figure 3:
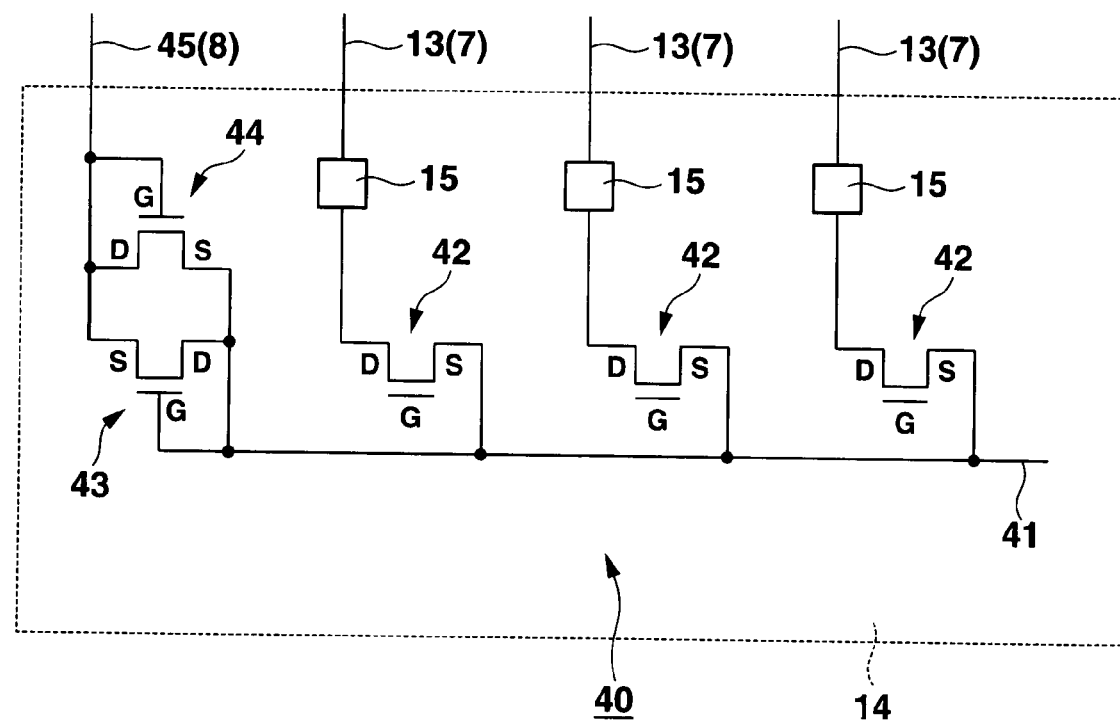
FIG. 3 is a plan view showing an equivalent circuit of a portion of a data-line static-electricity protecting circuit, which is formed in a data line driver forming area shown in FIG. 1.

FIG. 3 is a plan view showing an equivalent circuit of a portion of a data-line static-electricity protecting circuit 40 which is formed in the driver forming area 14 denoted by the data line. A data-line static-electricity protecting line 41 is provided within the driver forming area 14. A data-line static-electricity protecting thin film transistor (data-line static-electricity protecting element) 42 of a floating gate type is provided between the static-electricity protecting line 41 and each of the data output terminals 15 (thus, each of the data-line distribution wires 13 connected to the data line 7 shown in FIG. 1).

A gate electrode G of each data-line static-electricity protecting thin film transistor 42 is connected to nowhere, another word, is a floating gate. A drain electrode D of the transistor 42 is connected to its associated data output terminal 15, and a source electrode S thereof is connected to the data-line static-electricity protecting line 41.

One end of the data-line static-electricity protecting line 41 is connected to the common line 8 shown in FIG. 1 via first and second connection thin film transistors (connection elements) 43 and 44 interconnected in parallel, and a connection distribution wire 45. A gate electrode G and a drain electrode D of the first transistor 43 are electrically connected to the protecting line 41, and a source electrode S thereof is electrically connected to the common line 8 via a connection distribution wire 45. A gate electrode G and a drain electrode D of the second transistor 44 are electrically connected to the common line 8 via the connection distribution wire 45, and a source electrode S is connected to the data-line static-electricity protecting line 41.

Figure 4:
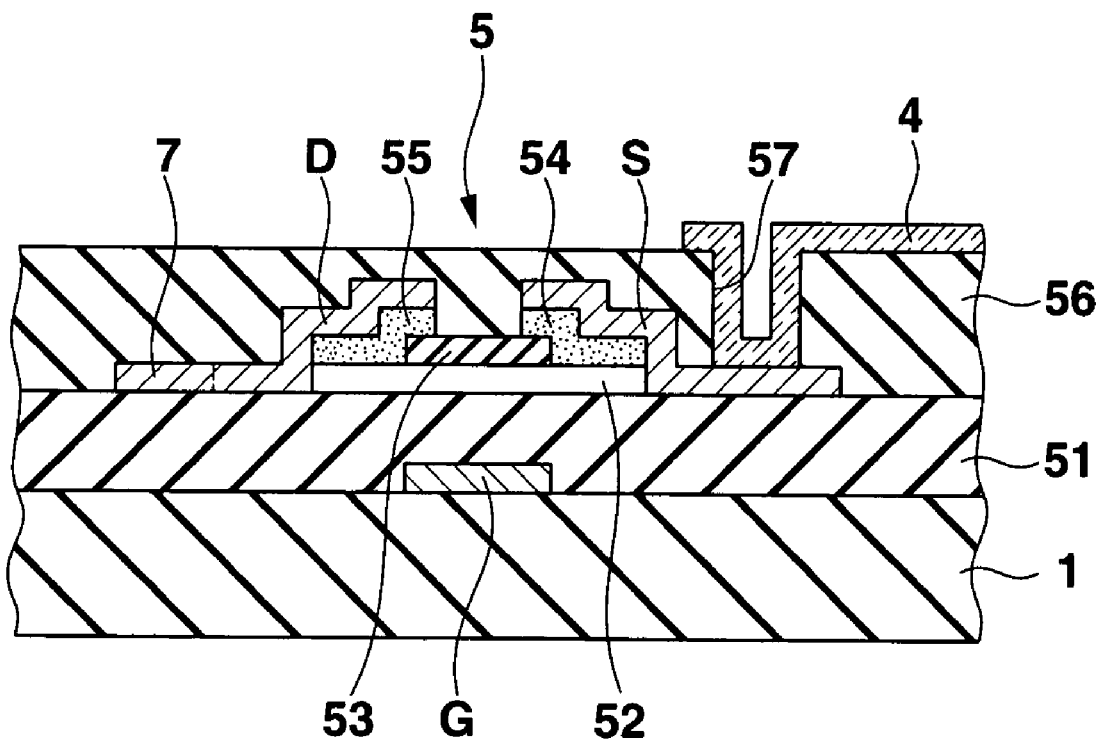
FIG. 4 is a cross sectional view showing a portion containing a thin-film transistor and a pixel electrode shown in FIG. 1.

Now, a specific structure of a part of the LCD device will be described. FIG. 4 is a cross sectional view showing a portion (one display pixel) containing the switching thin-film transistor 5 and the pixel electrode 4. A gate electrode G made of chromium, the scanning line 6 connected to the gate electrode G (see FIG. 1), and the scanning-line distribution wire 10 connected to the scanning lines 6 (see FIG. 1) are provided at a given location on the upper surface of an active substrate 1 made of glass, for example.

A gate insulating film 51 made of silicon nitride is provided so as to cover the gate electrode G, the scanning line 6, the scanning-line distribution wire 10 and the upper surface of the active substrate 1. A semiconductor thin film 52 made of intrinsic amorphous silicon is provided at a predetermined location on the upper surface of the gate insulating film 51 on the gate electrode G. A channel protecting film 53 made of silicon nitride is provided at the central part of the upper surface of the semiconductor thin film 52.

Ohmic contact layers 54 and 55 made of n-type amorphous silicon are formed on both end parts of the upper surface of the channel protecting film 53, and on the upper surfaces of both sides of the semiconductor thin film 52. A source electrode S made of, for example, chromium is provided on predetermined positions of the upper surfaces of the ohmic contact layer 54 and a part of the gate insulating film 51, which is located near the ohmic contact layer 54. A drain electrode D made of, for example, chromium, the data line 7 connected to the drain electrode D, and the data-line distribution wire 13 (see FIG. 1) connected to the data line 7 are provided at predetermined positions on the upper surface of the ohmic contact layer 55 and a part of the upper surface of the gate insulating film 51.

Thus, the switching thin-film transistor 5 is composed of the gate electrode G, the gate insulating film 51, the semiconductor thin film 52, the channel protecting film 53, the ohmic contact layers 54 and 55, the source electrode S, and the drain electrode D.

An overcoating film 56 made of silicon nitride is provided so as to cover the upper surfaces of the switching thin-film transistors 5, the data lines 7 and the gate insulating film 51. A pixel electrode 4 made of a transparent conductive material, such as ITO, is provided at a predetermined position on the upper surface of the overcoating film 56. The pixel electrode 4 is electrically connected to the source electrode S through a contact hole 57 which is formed in a predetermined position of the overcoating film 56.

Figure 5:
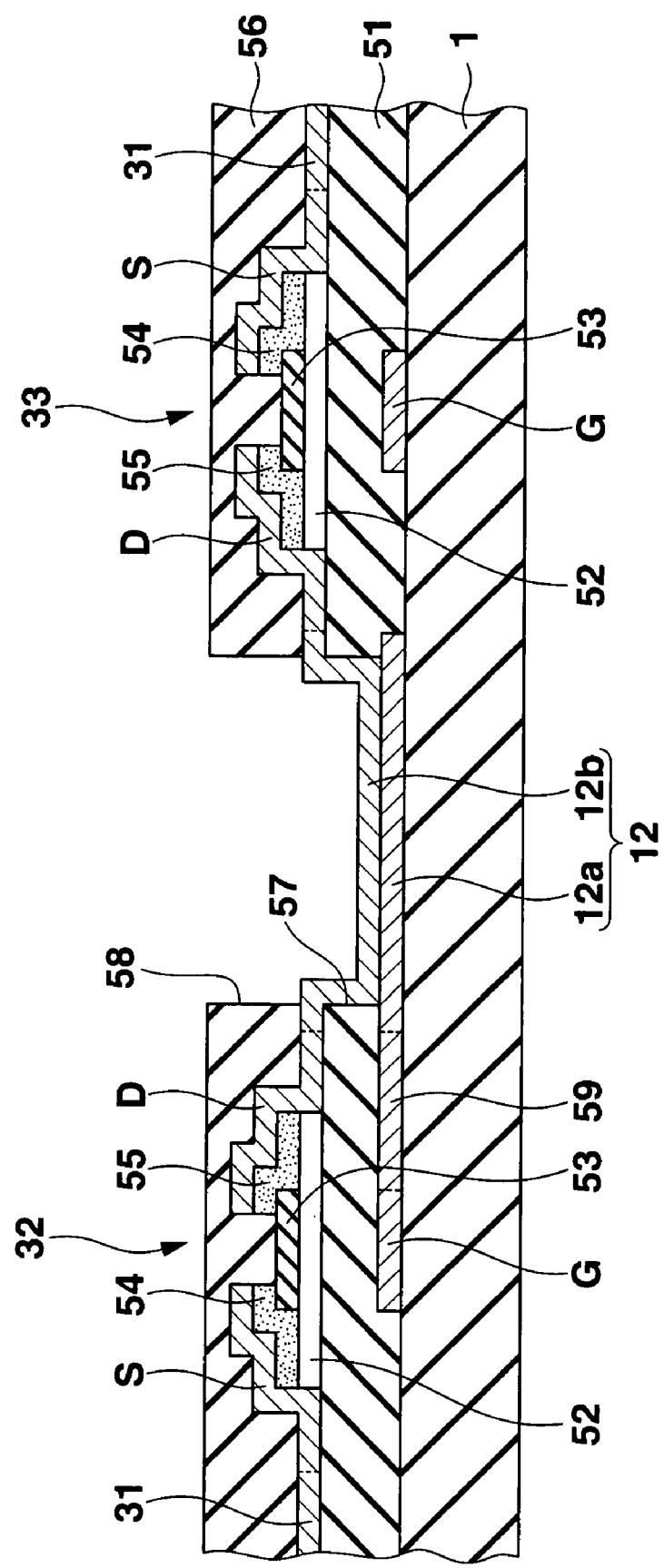
FIG. 5 is a cross sectional view showing a portion in the scanning line driver forming area shown in FIG. 2.

FIG. 5 is a cross sectional view showing a portion containing the first and second scanning-line static-electricity protecting thin film transistors 32 and 33, the scanning output terminal 12 and the scanning-line static-electricity protecting line 31 in the scanning line driver forming area 11. The first and second thin film transistors 32 and 33 have each substantially the same structure as that of the switching thin-film transistor 5 shown in FIG. 4. The transistors 32 and 33 are composed of the gate electrodes G, a gate insulating film 51, semiconductor thin films 52, channel protecting films 53, ohmic contact layers 54 and 55, the source electrodes S, and the drain electrodes D.

The scanning output terminal 12 has a double-layered structure of a lower metal layer 12a made of, for example, chromium, which is formed on the upper surface of the active substrate 1, and an upper metal layer 12b made of chromium, for example. The upper metal layer 12b is formed on the upper surface of a portion of the lower metal layer 12a, which is exposed through a contact hole 57 formed in the gate insulating film 51, and on the upper surface of a portion of the gate insulating film 51 around the contact hole 57. The upper surface of the output terminal 12 is exposed through an opening 58 formed in the overcoating film 56. The scanning-line static-electricity protecting line 31 is a metal layer made of, for example, chromium, which is formed on the upper surface of the gate insulating film 51.

The gate electrode G of the first thin film transistor 32 is electrically connected to the lower metal layer 12a of the scanning output terminal 12 through a distribution wire 59 made of, for example, chromium, which is formed on the upper surface of the active substrate 1. The drain electrode D of the first transistor 32 is electrically connected to the upper metal layer 12b of the scanning output terminal 12, and the source electrode S thereof is connected to the scanning-line static-electricity protecting line 31. The gate electrode G of the second thin film transistor 33 is a floating gate (see FIG. 2). The drain electrode D of the transistor 33 is connected to the upper metal layer 12b of the scanning output terminal 12, and the source electrode S thereof is connected to the scanning-line static-electricity protecting line 31.

Figure 6:
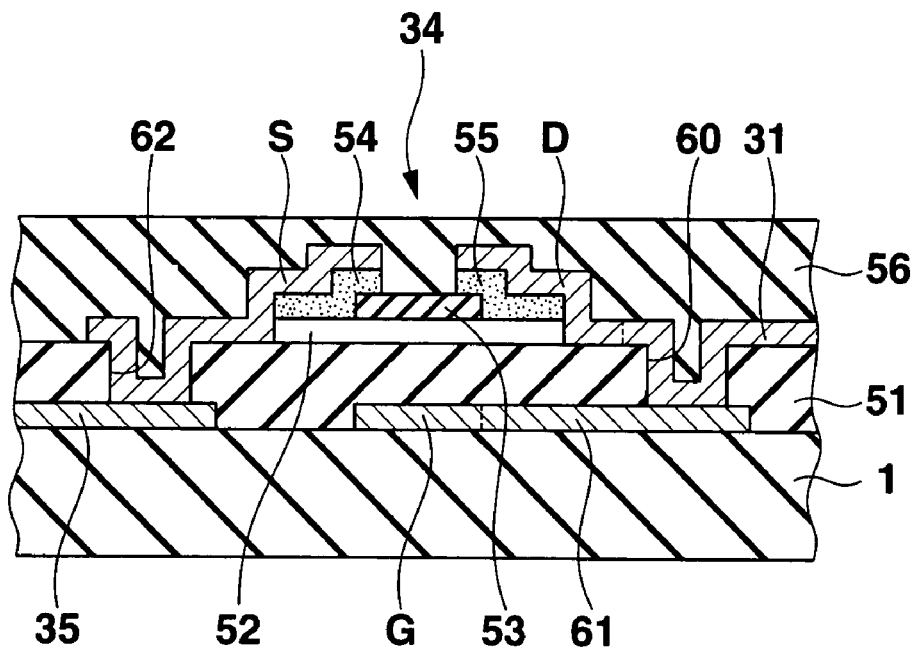
FIG. 6 is a cross sectional view showing another portion of the scanning line driver forming area shown in FIG. 2.

FIG. 6 is a cross sectional view showing a portion including the connection thin film transistor 34, the scanning-line static-electricity protecting line 31 and the connection distribution wire 35 in the scanning line driver forming area 11. The connection thin film transistor 34 has substantially the same structure as that of the switching thin-film transistor 5 shown in FIG. 4. The transistor 34 includes the gate electrode G, a gate insulating film 51, a semiconductor thin film 52, a channel protecting film 53, ohmic contact layers 54 and 55, the source electrode S, and the drain electrode D. The connection distribution wire 35 is a metal layer made of, for example, chromium, which is formed on the upper surface of the active substrate 1.

One end of the scanning-line static-electricity protecting line 31 provided on the upper surface of the gate insulating film 51 is electrically connected to a distribution wire 61 made of, for example, chromium, which is formed on the upper surface of the active substrate 1, through a contact hole 60 formed in the gate insulating film 51. The distribution wire 61 is electrically connected to the gate electrode G. Said one end of the protecting line 31 is also connected to the drain electrode D of the connection thin film transistor 34. The source electrode S of the transistor 34 is connected to the connection distribution wire 35 through a contact hole 62 formed in the gate insulating film 51.

Figure 7:
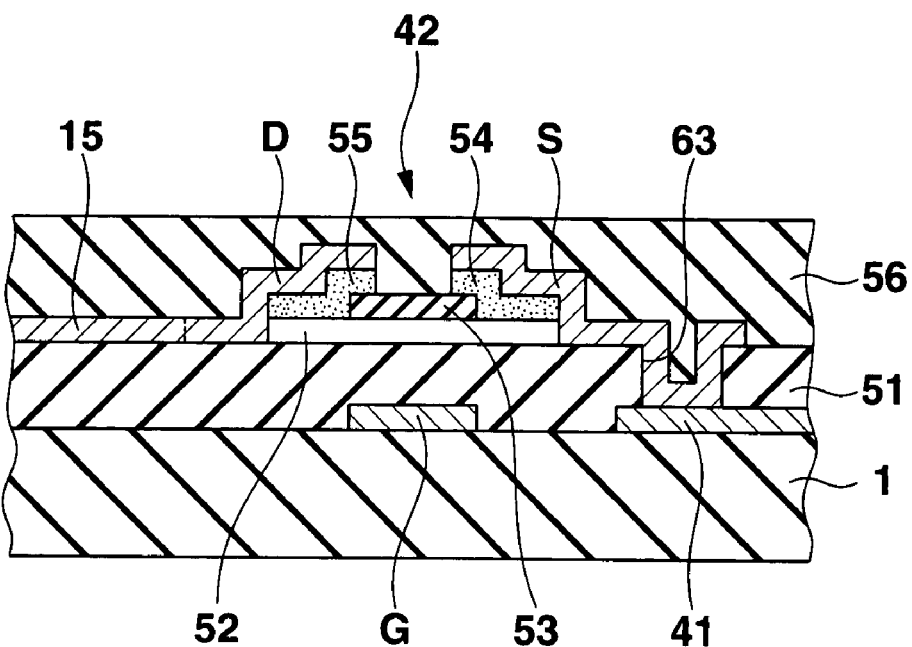
FIG. 7 is a cross sectional view showing a portion in the data line driver forming area shown in FIG. 3.

FIG. 7 is a cross sectional view showing a portion including the data-line static-electricity protecting thin film transistor 42, the data output terminal 15 and the data-line static-electricity protecting line 41 in the data line driver forming area 14. The data-line static-electricity protecting thin film transistor 42 has substantially the same structure as that of the switching thin-film transistor 5 shown in FIG. 4, and includes the gate electrode G, the gate insulating film 51, a semiconductor thin film 52, a channel protecting film 53, ohmic contact layers 54 and 55, the source electrode S, and the drain electrode D.

The data output terminal 15 is a metal layer made of, for example, chromium, which is formed on the upper surface of the gate insulating film 51. The data-line static-electricity protecting line 41 is a metal layer made of, for example, chromium, which is formed on the upper surface of the active substrate 1. The gate electrode G of the data-line static-electricity protecting thin film transistor 42 is a floating gate (see FIG. 3). The drain electrode D of the transistor 42 is electrically connected to the data output terminal 15, and the source electrode S is connected to the data-line static-electricity protecting line 41 through a contact hole 63 formed in the gate insulating film 51.

Figure 8:
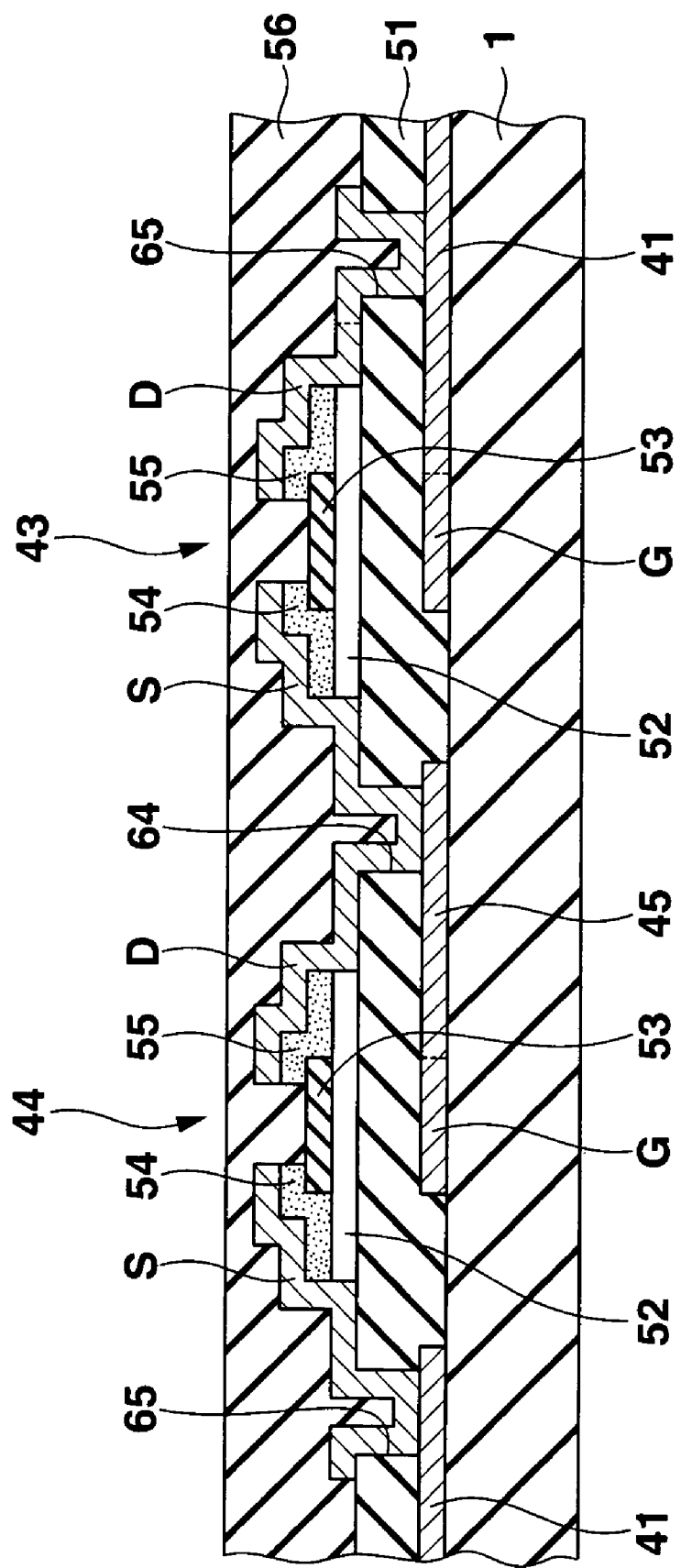
FIG. 8 is a cross sectional view showing another portion in the data line driver forming area shown in FIG. 3.

FIG. 8 is a cross sectional view showing a portion containing the first and second connection thin film transistors 43 and 44, the data-line static-electricity protecting line 41 and a connection distribution wire 45 in the data line driver forming area 14. The first and second transistors 43 and 44 have substantially the same structure as that of the switching thin-film transistor 5 shown in FIG. 4, and each includes the gate electrode G, the gate insulating film 51, a semiconductor thin film 52, a channel protecting film 53, ohmic contact layers 54 and 55, the source electrode S, and the drain electrode D. The connection distribution wire 45 is a metal layer of, for example, chromium, which is formed on the upper surface of the active substrate 1.

The gate electrode G of the first transistor 43 is connected to the data-line static-electricity protecting line 41. The gate electrode G of the second connection thin film transistor 44 is connected to the connection distribution wire 45. The source electrode S of the first transistor 43 and the drain electrode D of the second are connected to the connection distribution wire 45, through a contact hole 64 formed in the gate insulating film 51. The drain electrode D of the first transistor 43 and the source electrode S of the second transistor 44 are connected to the data-line static-electricity protecting line 41, through the same contact hole 65 (it is illustrated separately in FIG. 8, for ease of explanation) formed in the gate insulating film 51.

As shown in FIG. 5, the scanning output terminal 12 of the LCD device has a double-layered structure of the lower metal layer 12a formed on the upper surface of the active substrate 1, and the upper metal layer 12b. The upper metal layer 12b is formed on the upper surface part of the lower metal layer 12a, which is exposed through the contact hole 57 formed in the gate insulating film 51, and on the upper surface of the gate insulating film 51 around the lower metal layer.

Referring to FIGS. 1, 5 and 8, the gate electrodes G of at least the transistors 32, 33, 43, and 44 of all the transistors, the distribution wires 59, and the lower metal layers 12a of the scanning output terminals 12 are integrally formed on the active substrate 1 by the same process using the same metal material, for example, chromium. At the same time, the scanning lines 6, the scanning-line distribution wires 10 and the three sides of the common line 8 rectangular in shape, except the right side 8a (see FIG. 1), are formed. Also at the same time, the scanning input terminals 16, the scanning distribution wires 17 and the external scanning connection terminals 18 are integrally formed.

After the gate insulating film 51 is deposited, and then the contact holes 57 (see FIG. 5), 64, and 65 (see FIG. 8) are formed, the upper parts of each of the thin film transistors, on the upper side of the gate insulating film 51 are formed. The drain electrodes D of the thin film transistors 32 and 33 are formed integral with the upper metal layer 12b laminated on the lower metal layer 12a of the scanning output terminal 12. As the result of forming the upper metal layer 12b of the scanning output terminal 12, the scanning output terminal 12 has the double-layered structure of the lower metal layer 12a and the upper metal layer 12b. At the same time, the gate electrodes G and the scanning lines 6 corresponding thereto are connected by the scanning-line distribution wire 10. Further, the drain electrodes D of the thin film transistors 32 and 33 are connected by the scanning-line distribution wire 10.

At the same time of forming the drain electrodes D of the scanning line-static electricity-protecting thin film transistors 32 and 33, and the upper metal layers 12b of the scanning output terminals 12, the data lines 7 and scanning-line distribution wires 13 corresponding thereto are formed. Similarly, the drain electrodes D of the first and second connection thin film transistors 43 and 44 are formed, and the scanning-line static-electricity protecting line 31 and the data-line static-electricity protecting line 41 are formed. Furthermore, the data input terminals 19, the data distribution wires 20 and the external data connection terminals 21 are integrally formed and besides, the right side 8a of the rectangular common line 8 and the common distribution wire 22 are formed.

Accordingly, the double-layered scanning output terminal 12 serves also as an interlayer contact for connecting the scanning-line distribution wire 10 connected to the scanning line 6 and the drain electrodes D of the first and second scanning-line static-electricity protecting thin film transistors 32 and 33, and for connecting the gate electrode G of the first transistor 32 and the drain electrodes D of the first and second transistors 32 and 33. This fact results in reduction of the number of interlayer contacts. The external electrodes of the scanning line driving chip are directly bonded onto the upper metal layers 12b of the double-layered scanning output terminals 12 by the flip-chip method (face-down method).

Also in the LCD device, as shown in FIG. 1, the scanning-line static-electricity protecting line 31, the first and second scanning-line static-electricity protecting thin film transistors 32 and 33, and the connection thin film transistor 34 are provided in the scanning line driver forming area 11 on the extended part 1a, which is located outside the display area 3 on the active substrate 1. Therefore, there is no need of securing an additional area to arrange the lines and the transistors, and hence, the frame area is correspondingly reduced.

Additionally, in the LCD device, the data-line static-electricity protecting line 41, the data-line static-electricity protecting thin film transistors 42 and the first and second connection thin film transistors 43 and 44 are formed in the data line driver forming area 14 on the extended part 1a, which is located outside the display area 3 on the active substrate 1. Therefore, there is no need of securing an additional area to arrange the lines and the transistors, and hence, the frame area is correspondingly reduced.

Static electricity protecting operation of the LCD device thus configured will be described hereunder. Fault of the switching thin-film transistors 5, which is due to static electricity, occurs only when positive static electricity invades. Accordingly, description to follow is the operation of the LCD device only when the static electricity invaded is positive.

Assume that positive static electricity invades into one scanning line 6 from the outside for some reason. In this case, the first scanning-line static-electricity protecting thin film transistor 32 is then turned on, which is connected to the scanning line 6 through the scanning-line distribution wire 10 and the scanning output terminal 12. Current having flowed through the scanning line 6 flows into the scanning-line static-electricity protecting line 31 via the first scanning-line static-electricity protecting thin film transistor 32. The scanning-line static-electricity protecting line 31 goes high in potential.

When the potential of the scanning-line static-electricity protecting line 31 is high, the second scanning-line static-electricity protecting thin film transistors 33 connected to the remaining scanning lines 6 are then conductive. The current derived from the scanning-line static-electricity protecting line 31 flows into the remaining scanning lines 6 through the second scanning-line static-electricity protecting thin film transistors 33, so that all the scanning lines 6 are equal in potential.

As described above, when the scanning-line static-electricity protecting line 31 goes high in potential, the connection thin film transistor 34 is turned on. Then, the current flows from the protecting line 31 into the common line 8 via the transistor 34, flows through the common connection pad 9 and the inter-substrate conductive member and reaches the counter electrodes of the counter substrate 2. As a result, the positive static electricity having invaded into the scanning lines 6 from outside for some reason is discharged, thereby to prevent such faults as the characteristic shift and insulation breakdown caused by the static electricity of the switching thin-film transistor 5.

In this case, the connection thin film transistor 34 allows current to flow only in the unidirection, i.e., from the drain electrode D to the source electrode S. When the scanning-line static-electricity protecting line 31 is higher in potential than the common line 8, the current flows from the scanning-line static-electricity protecting line 31 to the common line 8 by way of the transistor 34. However, the current never flows in the reverse direction, thereby suppressing increase of power consumption.

On the other hand, assume that positive static electricity invades into any one of the data lines 7 from outside for some reason. In this case, the data-line static-electricity protecting thin film transistor 42 connected to the data line 7 is then conductive, and current flows from the data line 7 into the data-line static-electricity protecting line 41 via the transistor 42 connected thereto. As a result, the potential of the data-line static-electricity protecting line 41 becomes high.

When the data-line static-electricity protecting line 41 is high in potential, the data-line static-electricity protecting thin film transistors 42 connected to the remaining data lines 7 are conductive, and currents flows from the protecting line 41 to the remaining data lines 7 via the data transistors 42. As a result, all the data lines 7 are equal in potential.

As described above, when the data-line static-electricity protecting line 41 goes high in potential, the first connection thin film transistor 43 is turned on, and current flows from the protecting line 41 through the first transistor 43 and the connection distribution wire 45 to the common line 8, flows through the common connection pad 9 and the inter-substrate conductive member and reaches the counter electrodes of the counter substrate 2. As a result, the positive static electricity having invaded into the data lines 7 from outside for some reason is discharged, thereby to prevent such faults as the characteristic shift and insulation breakdown caused by the static electricity of the switching thin-film transistor 5.

When the potential of the data-line static-electricity protecting line 41 is higher than that of the common line 8, the first connection thin film transistor 43 is turned on, and thus, current flows from the protecting line 41 to the common line 8. On the other hand, when the potential of the common line 8 is higher than that of the protecting line 41, the second connection thin film transistor 44 is turned on and thus, the current flows from the common line 8 to the protecting line 41. When the potential difference between the protecting line 41 and the common line 8 is small, it is hard for the current to flow in both the directions. As a result, increase of the power consumption is hard to occur.

As seen from the foregoing description, the static electricity protecting circuits are provided in the driver forming area located outside the display area on the substrate. Therefore, there is no need of securing an additional area to arrange the static electricity protecting circuits, and hence, the frame area is correspondingly reduced.

As shown in FIG. 7, the data-line static-electricity protecting line 41 is formed on the upper surface of the active substrate 1. Accordingly, as shown in the figure, the source electrode S of the data-line static-electricity protecting thin film transistor 42 is connected to the protecting line 41 via the contact hole 63. This necessitates the contact hole 63. A second embodiment of the present invention to be given hereunder successfully eliminates the use of the contact hole 63.

Second Embodiment

Figure 9:
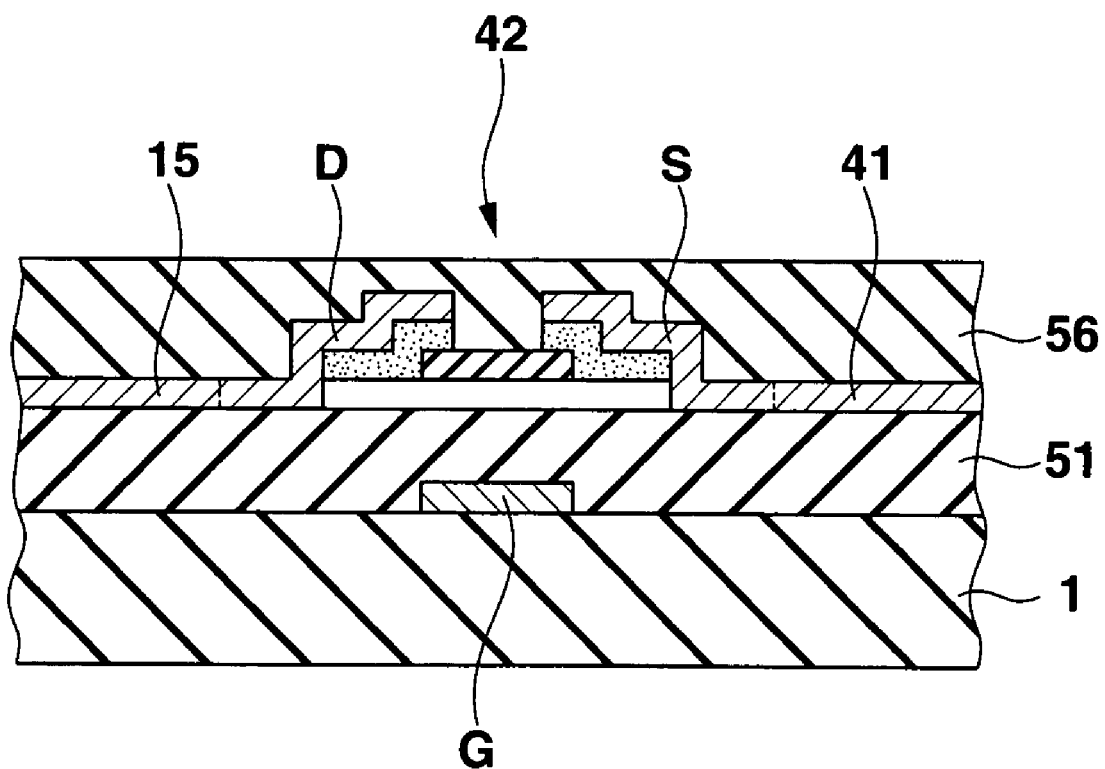
FIG. 9 is a cross sectional view showing an LCD device according to a second embodiment of the present invention, the view resembling that of FIG. 7.

FIG. 9 is a cross sectional view showing an LCD device according to a second embodiment of the present invention, the view resembling that of FIG. 7. In the LCD device, the source electrode S of the data-line static-electricity protecting thin film transistor 42 is connected to the data-line static-electricity protecting line 41 formed on the upper surface of the gate insulating film 51. Therefore, there is no need of forming the contact hole 63, and hence, the interlayer contact part is correspondingly reduced.

Figure 10:
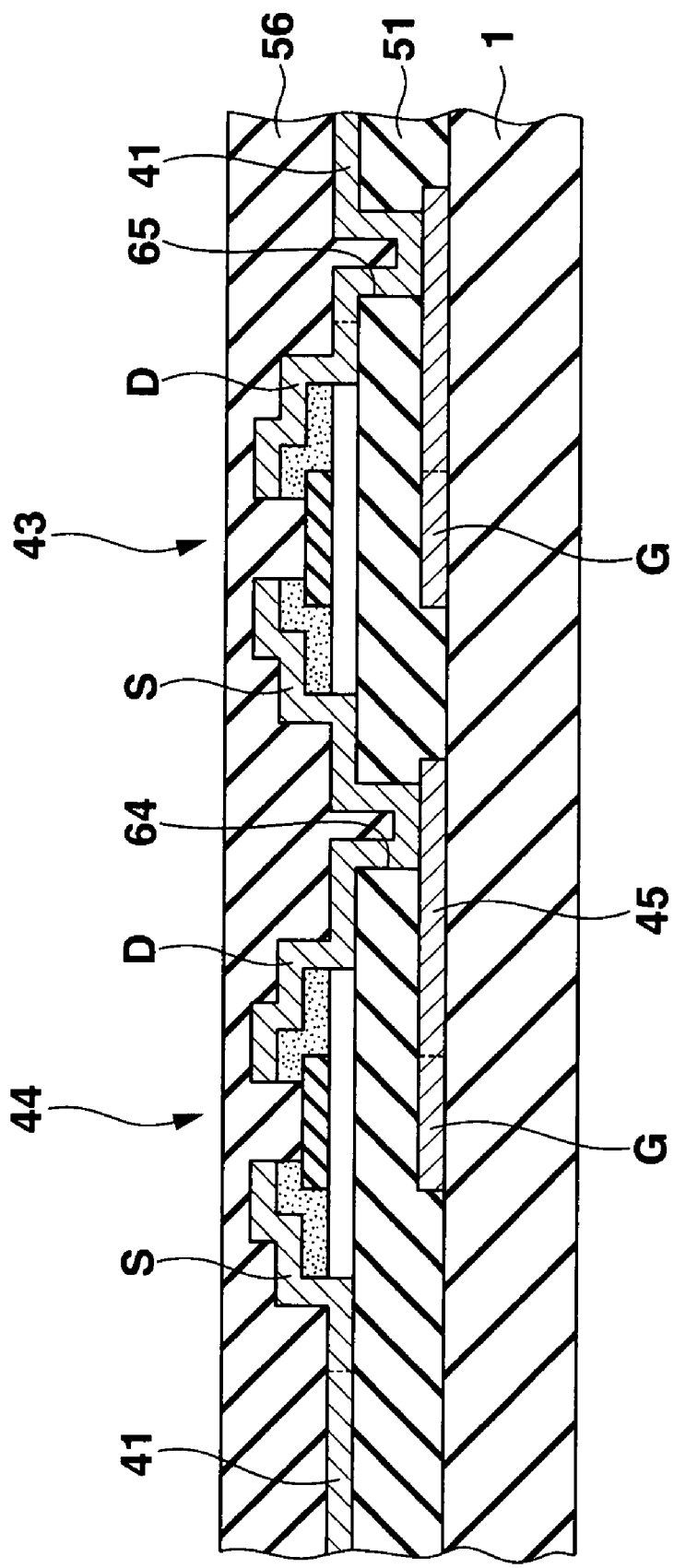
FIG. 10 is a cross sectional view showing the LCD device of the second embodiment, the view resembling that of FIG. 8.

In the second embodiment, as shown in FIG. 10 as the cross sectional view as in FIG. 8, the data-line static-electricity protecting line 41 is provided on the upper surface of the gate insulating film 51. Even in this case, it is necessary to use the contact hole 64 for connecting the source electrode S of the first connection thin film transistor 43 and the drain electrode D of the second connection thin film transistor 44 to the connection distribution wire 45, and the contact hole 65 for connecting the data-line static-electricity protecting line 41 to the gate electrode G of the first connection thin film transistor 43.

Third Embodiment

Figure 11:
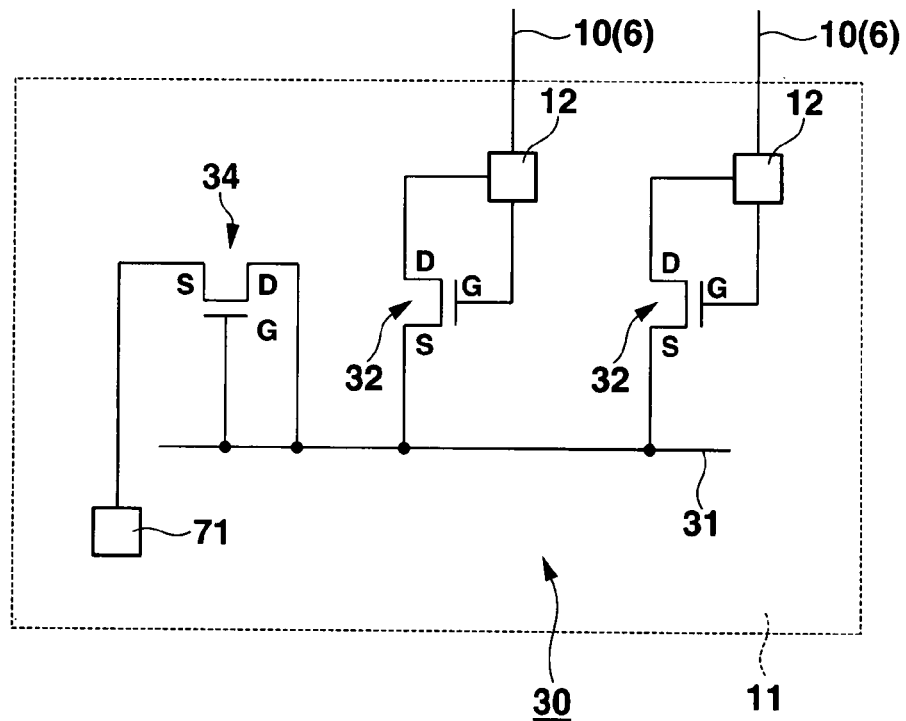
FIG. 11 is a plan view showing an equivalent circuit of a portion of an LCD device according to a third embodiment of the invention, the view resembling that of FIG. 2.

FIG. 11 is a plan view showing an equivalent circuit of a portion of an LCD device according to a third embodiment of the invention, the view resembling that of FIG. 2. The instant LCD device is different from that of FIG. 2 in that the second scanning-line static-electricity protecting thin film transistor 33 is omitted, and the source electrode S of the connection thin film transistor 34 is connected to a Vgl terminal 71 provided in the scanning line driver forming area 11.

In this case, negative voltage (e.g., Vgl=−20V to −15V) to be applied to the scanning lines 6 being in a non-select state is applied to the Vgl terminal 71. The potential Vgl (−20V to −15V) of the scanning lines 6 in the non-select state is lower than the potential (e.g., Vcom=−5V to +5V) of the common line 8. Accordingly, an alternative is allowed in which the current flows from the scanning-line static-electricity protecting line 31 to the Vgl terminal 71 by way of the connection thin film transistor 34.

Fourth Embodiment

Figure 12:
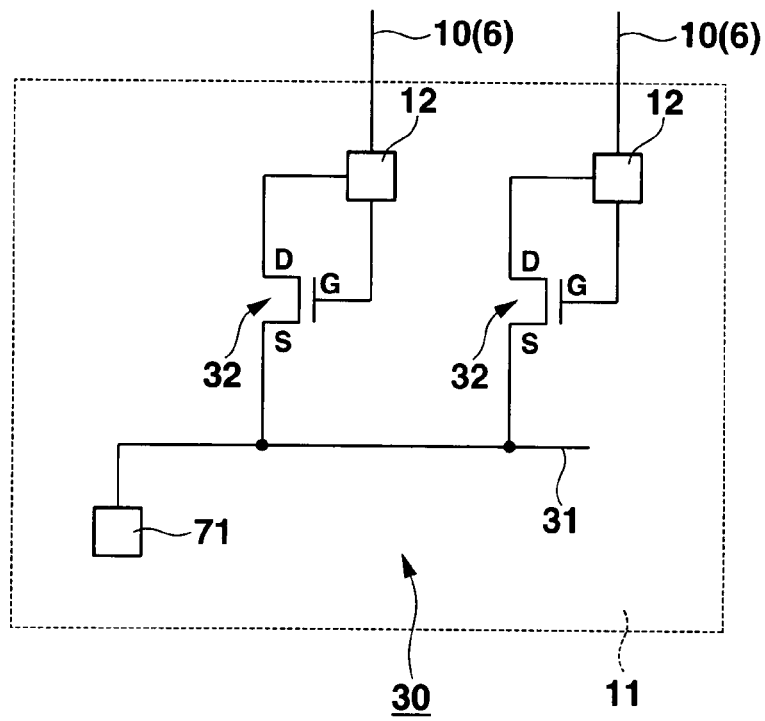
FIG. 12 is a plan view showing an equivalent circuit of an LCD device according to a fourth embodiment of the invention, the view resembling that of FIG. 11.

FIG. 12 is a plan view showing an equivalent circuit of an LCD device according to a fourth embodiment of the invention, the view resembling that of FIG. 11. The instant LCD device is different from that shown in FIG. 11 in that the connection thin film transistor 34 is omitted, and one end of the scanning-line static-electricity protecting line 31 is directly connected to the Vgl terminal 71. In the embodiment, the current directly flows from the scanning-line static-electricity protecting line 31 to the Vgl terminal 71.

Other Embodiments

In the case of FIG. 3, the source electrode S of the first connection thin film transistor 43 and the gate electrode G and the drain electrode D of the second connection thin film transistor 44 are not connected to the connection distribution wire 45, but may be connected to the Vgl terminal 71, as in the case of FIG. 11. Also in the case of FIG. 3, the first and second transistors 43 and 44 may be omitted, but as in the case of FIG. 12, one end of the data-line static-electricity protecting line 41 may be connected to the Vgl terminal 71.

In the embodiments, the scanning line driver forming area 11 is separated from the data line driver forming area 14. A one-chip driver is commercially available in which a scanning line driver forming area and a data line driver forming area are fabricated into one chip. In such a one-chip driver, the scanning line driver forming area and the data line driver forming area are continuously fabricated, and a scanning-line static-electricity protecting circuit and a data-line static-electricity protecting circuit are formed in the continuously formed area, continuously or separately from each other.

In the embodiments, the scanning line driver forming area 11 and the data line driver forming area 14 are formed in the extended part 1a, which forms one side of the active substrate 1. In an alternative, plural sides of the active substrate are protruded, the scanning line driver forming area and the data line driver forming area are formed in those protruded parts, and the static-electricity protecting circuits are provided in association with those areas.

In the embodiments, it is not essential to entirely form the static electricity protecting circuits within the driver forming areas. If required, the static electricity protecting circuits may be formed, parts of which are located out of the driver forming areas.

While the LCD device is used for the display device in each embodiment mentioned above, it is evident that the display device may take the form of any of display devices based on other types of display elements, such as an organic EL and a field emission device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device comprising:
    a substrate having a display area and a non-display area;
    a plurality of pixel electrodes arrayed in a matrix within the display area on the substrate;
    a plurality of switching thin-film transistors connected respectively to the pixel electrodes; and
    a plurality of scanning lines to supply a scanning signal to the switching thin-film transistors;
    wherein the non-display area of the substrate includes a driver mounting area in which a driver for driving the scanning lines is mounted;
    wherein a static-electricity protecting circuit for controlling discharge of static electricity applied to the scanning lines and connection terminals for electrically connecting the driver to the scanning lines are provided in the driver mounting area;
    wherein the static-electricity protecting circuit includes a diode-connected thin film transistor, which comprises a gate electrode and a drain electrode which are formed of different layers and which are electrically connected to one of the connection terminals;
    wherein the static-electricity protecting circuit includes a static-electricity protecting line, and the diode-connected thin film transistor is connected between the static-electricity protecting line and said one of the connection terminals;
    wherein the static-electricity protecting circuit includes a thin film transistor of a floating gate type; and
    wherein the diode-connected thin film transistor and the thin film transistor of a floating gate type are connected in parallel to each other between the static-electricity protecting line and said one of the connection terminals.

2. The display device according to claim 1, further comprising a common line which surrounds the display area.

3. The display device according to claim 2, further comprising a connection element connected between the static-electricity protecting line and the common line.

4. The display device according to claim 3, wherein the connection element includes a diode-connected thin film transistor provided with a gate electrode, a source electrode and a drain electrode, the gate electrode and the drain electrode being interconnected.

5. The display device according to claim 1, wherein the static-electricity protecting line is entirely arranged within the driver mounting area.

6. The display device according to claim 1, wherein the gate electrode of the diode-connected thin film transistor and a drain electrode of the thin film transistor of a floating gate type are formed of different layers and electrically connected to the connection terminal.

7. A display device comprising:
    a substrate having a display area and a non-display area;
    a plurality of pixel electrodes arrayed in a matrix within the display area on the substrate;
    a plurality of switching thin-film transistors connected respectively to the pixel electrodes;
    a plurality of scanning lines to supply a scanning signal to the switching thin-film transistors; and
    a plurality of data lines to supply a data signal to the switching thin-film transistors;
    wherein the non-display area of the substrate includes a driver mounting area in which a driver for driving the scanning lines is mounted;
    wherein a static-electricity protecting circuit for controlling discharge of static electricity applied to the scanning lines and connection terminals for electrically connecting the driver to the scanning lines are provided in the driver mounting area;
    wherein the static-electricity protecting circuit includes a diode-connected thin film transistor, which comprises a gate electrode and a drain electrode which are formed of different layers and which are electrically connected to one of the connection terminals;
    wherein the non-display area of the substrate includes another driver mounting area in which another driver for driving the data lines is mounted;
    wherein another static-electricity protecting circuit for controlling discharge of static electricity applied to the data lines is provided in the another driver mounting area; and
    wherein the driver mounting area and the another driver mounting area are arranged in the non-display area on the same one side of the display area.

8. The display device according to claim 7, wherein other connection terminals for electrically connecting the data lines to the another driver are arranged in the another driver mounting area; and
    wherein the connection terminals and the other connection terminals are arranged in line.

* * * * *